(12) United States Patent
Bette et al.

(10) Patent No.: US 7,553,566 B2
(45) Date of Patent: Jun. 30, 2009

(54) FUEL CELL MODULE

(75) Inventors: Willi Bette, Erlangen (DE); Josef Lersch, Heroldsbach (DE); Arno Mattejat, Bubenreuth (DE); Karl Strasser, Erlangen (DE)

(73) Assignee: Siemens Aktiengesellschaft, Munich (DE)

( * ) Notice: Subject to any disclaimer, the term of this patent is extended or adjusted under 35 U.S.C. 154(b) by 479 days.

(21) Appl. No.: 10/381,465

(22) PCT Filed: Sep. 14, 2001

(86) PCT No.: PCT/DE01/03540

§ 371 (c)(1),
(2), (4) Date: Mar. 26, 2003

(87) PCT Pub. No.: WO02/27841

PCT Pub. Date: Apr. 4, 2002

(65) Prior Publication Data

US 2004/0101737 A1 May 27, 2004

(30) Foreign Application Priority Data

Sep. 26, 2000 (DE) ................................ 100 47 587

(51) Int. Cl.
*H01M 8/00* (2006.01)
(52) U.S. Cl. .................. 429/12; 429/32; 429/10; 439/754; 439/756; 29/745; 29/746

(58) Field of Classification Search ................ 429/12, 429/32, 37, 745–746, 754–774, 10; 29/745–746; 439/754–774
See application file for complete search history.

(56) References Cited

U.S. PATENT DOCUMENTS

| 3,316,167 | A | * | 4/1967 | Worsham et al. | ............ 204/268 |
| 4,719,157 | A | * | 1/1988 | Tsutsumi et al. | ............ 429/34 |
| 4,758,481 | A | * | 7/1988 | Fauvel | ............ 429/39 |
| 5,804,328 | A | * | 9/1998 | Odegard et al. | ............ 429/32 |
| 2001/0036568 | A1 | * | 11/2001 | Farkash et al. | ............ 429/26 |

FOREIGN PATENT DOCUMENTS

EP 0279072 8/1988

* cited by examiner

*Primary Examiner*—Jane Rhee
(74) *Attorney, Agent, or Firm*—Harness, Dickey & Pierce, P.L.C.

(57) ABSTRACT

A fuel cell module includes a number of series-connected fuel cells which collectively form a fuel cell stack in such a way that the magnetic field or stray field that is generated during the operation of the fuel cell module and that is detectable in an outer area is kept particularly small. To this end, the invention provides that a number of shielding lines that are connected to a first pole flange of the fuel cell stack are provided, these shielding lines being guided on the outer area of the fuel cell stack, as far as a contact area to a second pole flange of the fuel cell stack.

13 Claims, 1 Drawing Sheet

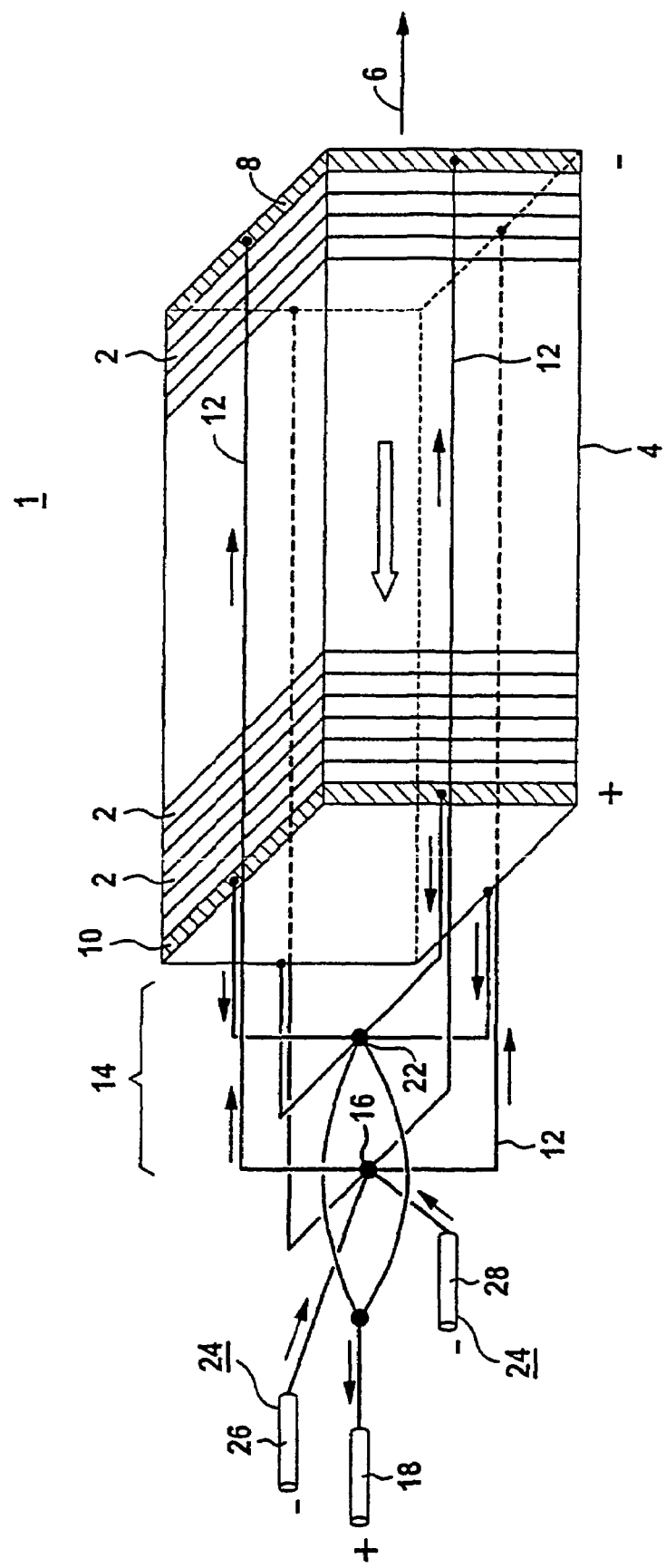

FUEL CELL MODULE

This application is the national phase under 35 U.S.C. § 371 of PCT International Application No. PCT/DE01/03540 which has an International filing date of Sep. 14, 2001, which designated the United States of America and which claims priority on German Patent Application number DE 100 47 587.6 filed Sep. 26, 2000, the entire contents of which are hereby incorporated herein by reference.

FIELD OF THE INVENTION

The invention generally relates to a fuel cell module having a number of series-connected fuel cells which are combined to form a fuel cell stack.

BACKGROUND OF THE INVENTION

Fuel cells may be used for environmentally friendly generation of electricity. A process which essentially represents the converse of electrolysis takes place in a fuel cell. A fuel which includes hydrogen is supplied to an anode in a fuel cell, and an auxiliary substance which includes oxygen is supplied to a cathode. The anode and cathode are in this case electrically isolated from one another via an electrolyte layer, in which case, although the electrolyte layer allows ions to be exchanged between the fuel and the oxygen, the electrolyte layer otherwise ensures that the fuel and the auxiliary substance are separated in a gastight manner. As a consequence of the exchange of ions, hydrogen which is included in the fuel can react with the oxygen to form water, with electrons being enriched on the fuel-side electrode or anode, and electrons being absorbed on the auxiliary substance side electrode or cathode.

During operation of the fuel cell, a usable potential difference or voltage is thus formed between the anode and cathode, with the only waste product from the electricity generation process being water. The electrolyte layer which, in the case of a high-temperature fuel cell, may be in the form of a ceramic solid electrolyte, or in the case of a low-temperature fuel cell may be in the form of a polymer membrane, thus has the function of separating the reactants from one another, of carrying the charge in the form of ions, and of preventing an electron short circuit.

Owing to the electrochemical potentials of the substances that are normally used in a fuel cell such as this, an electrode voltage of about 0.6 to 1.0 V can be formed in normal operating conditions, and can be maintained during operation. For technical applications in which a considerably higher total voltage may be required depending on the purpose or the planned load, a number of fuel cells are thus normally connected electrically in series in the manner of a fuel cell stack, such that the sum of the electrode voltages produced by each of the fuel cells corresponds to or is greater than the required total voltage. Depending on the required total voltage, the number of fuel cells in a fuel cell stack such as this may, for example, be 50 or more.

In order to make use of the potential difference which is generated during operation of the fuel cells that are joined together so as to form such a fuel cell stack, the circuitry of the fuel cell stack is provided with a load. In this case, a so-called pole plate, to which the electrical input and output cables can be connected, is arranged on each of the two outermost series-connected fuel cells in the fuel cell stack, in order to provide the electrical connection for the load.

Owing to the particular operating characteristics of such fuel cells and, in particular, with respect to the generation of just water as the only significant waste product, fuel cells are also particularly suitable for use for power supplies in intrinsically closed mobile systems, such as underwater vehicles. In this case, it is particularly advantageous that a comparatively high output current at a normal voltage level can be achieved with only restricted physical dimensions, in the form of comparatively high power density in a fuel cell arrangement.

Furthermore, particularly when used in underwater vehicles, the fuel, that is to say the substance which includes the hydrogen, can be produced in a comparatively compact form. In this case, pure oxygen may be used as the auxiliary substance or oxidant. In this case, the hydrogen may in particular be stored in hydride tanks.

When fuel cells are actually used in an underwater vehicle, it may be desirable to keep the signature that is emitted to the exterior, that is to say the externally detectable indications of operation of the underwater vehicle, particularly low. This signature may also include magnetic fields, which are produced by the currents that flow in and out during operation of fuel cells.

SUMMARY OF THE INVENTION

An embodiment of the invention is thus based on an object of specifying a fuel cell module having a number of series-connected fuel cells which are combined to form a fuel cell stack, in which the magnetic field or stray field which is produced during its operation and can be detected in an external area is kept particularly low.

According to an embodiment of the invention, this object may be achieved in that a number of shielding cables are provided, which are connected to a first pole plate of the fuel cell stack and are routed on the external area of the fuel cell stack along its stacking direction as far as a contact area for a second pole plate of the fuel cell stack.

An embodiment of the invention is in this case based on the idea that the magnetic field which can be detected in the external area of the fuel cell module during its operation can be kept particularly low by magnetically compensating for the operating currents to a particularly large extent in some suitable manner. Magnetic computation may in this case be carried out by that spatial area in which a significant operating current occurs being surrounded in a suitable manner by current return paths, in the manner of a coaxial arrangement. The current return paths should in this case be designed such that a compensation current which flows there in the opposite direction to the operating current compensates sufficiently for the magnetic field produced in the external area by the operating current. In the case of a fuel cell stack which comprises a number of series-connected fuel cells, a significant current occurs in the fuel cells themselves during operation, owing to the activity of the fuel cells. This operating current should be magnetically shielded to an adequate extent by suitable routing of currents in the opposite direction. For this purpose, the shielding cables are routed along the external area of the fuel cell stack.

A particularly uniform shielding effect in the external area of the fuel cell module can be achieved in that, in one advantageous refinement, the shielding cables are arranged symmetrically around the central axis, which is extended in the stacking direction, of the fuel cell stack. A refinement such as this is particularly reliable for shielding the magnetic field when the fuel cell stack has an approximately square cross section with respect to its central axis.

In an alternative or additional advantageous refinement, the shielding cables are arranged at approximately uniform intervals on the circumference of the cross section, determined in the stacking direction, of the fuel cell stack. A refinement such as this is also particularly suitable for reliable shielding of the magnetic field when the fuel cell stack does not have a square cross section, for example having a rectangular cross section. In this case, for example, if the fuel cell stack were to have a cross section with a length-to-width ratio of approximately 2 to 1, it would be possible to provide for two shielding cables to be arranged on each of its longitudinal faces and one shielding cable to be arranged on each of its width faces, with each shielding cable being at an approximately uniform distance from the respective shielding cables adjacent to it in this case.

In order to allow the shielding cables to be connected in a particularly simple manner to a power cable which continues further, the shielding cables are advantageously joined together in the contact area to form a first connecting contact, also referred to as a star point or current node. The contact can then be produced to a connecting point or directly to a load from this connecting contact via, for example, a single conductor which continues further. The current which is carried by the shielding cables is combined by the connecting contact at one point, from where it is passed on further. If the contact to a connecting point or to the load is produced, for example, by a number of cables, then the connecting contact—even if the currents are not distributed uniformly between the shielding cables—results in a uniform distribution of the currents in the cables which continue further. Thus, the stray field from the fuel cell module is independent of external influences.

In order to keep the stray magnetic field particularly low in this refinement, an additional advantageous development provides for a number, corresponding to the number of shielding cables, of connecting cables to be arranged on the second pole plate of the fuel cell stack, which are joined together to form a second connecting contact, with each connecting cable being routed in the contact area in the immediate vicinity of a respective shielding cable. This arrangement results in a particularly simple manner in each current-carrying cable being immediately adjacent to a further cable, which carries approximately the same current level in the opposite direction. The area which is surrounded by the current and the return current and which can essentially be used as a measure of the stray magnetic field that results in the external area is kept particularly small with this arrangement.

In order to electrically connect a load to fuel cell modules which are designed in this way and have low stray fields in some suitable manner with low stray fields as well, a further advantageous refinement provides for the first pole plate to be connected to a power cable, and for the second pole plate to be connected to a power cable system which surrounds the power cable in the manner of a coaxial arrangement. These connections may in this case be produced in particular with the interposition of said first or second connecting content.

The advantages which are achieved by embodiments of the invention include, in particular, that any stray magnetic field which can be detected in the external area of the fuel cell module is kept particularly low by returning the operating current, which flows through the fuel cell stack during this operation, along the external area of the fuel cell stack as far as the contact area for the corresponding pole plate. This is because, in this arrangement, the operating current which flows in the fuel cell stack is surrounded in the external area of the fuel cell stack by return currents which flow in the opposite direction and whose overall magnitude corresponds to the operating current. Reliable shielding of the operating current which flows in the fuel cells themselves is thus also ensured for the actual fuel cell module, in the form of a coaxial arrangement.

BRIEF DESCRIPTION OF THE DRAWINGS

An exemplary embodiment of the arrangement will be explained in more detail with reference to a drawing, in which the FIGURE shows a fuel cell module.

DETAILED DESCRIPTION OF THE PREFERRED EMBODIMENTS

The fuel cell module 1 shown in the FIGURE has a number of fuel cells 2. The fuel cells 2 are electrically connected in series and are spatially combined to form a fuel cell stack 4. Each fuel cell 2 in this case has two flat electrodes, which are physically and electrically isolated from one another via an electrolyte. The electrodes of each fuel cell 2 are each directly connected to the electrodes facing them on the fuel cells 2 that are adjacent to them. The first and last fuel cells 2 seen in the stacking direction of the fuel cell stack 4 as indicated by the arrow 6 are, in contrast, connected by their electrode, which is arranged on the respective edge of the fuel cell stack 4, to a negative pole plate or first pole plate 8 and, respectively, to a positive pole plate or second pole plate 10.

The first pole plate 8 and the second pole plate 10 are in this case used for the outward and return supply of an operating current for the fuel cell stack 4 during its operation. This is because the recombination of the hydrogen and of the oxygen in the materials that are supplied to the fuel cells 2 during operation of the fuel cell stack 4 results in a redistribution of electrons, which on the one hand leads to the usable potential difference described above, and on the other hand corresponds in the steady state to an operating current through the fuel cell stack 4. This operating current produces a stray magnetic field in the external area of the fuel cell stack 4. However, the fuel cell module 1 is designed such that this stray magnetic field is kept particularly low.

For this purpose, the first pole plate 8 of the fuel cell stack 4 is connected to a number of shielding cables 12. The shielding cables 12 are arranged on the external area of the fuel cell stack 4, along its stacking direction as indicated by the arrow 6, and are intended to provide the return path for the operating current, which flows through the fuel cells 2 in the interior of the fuel cell stack 4, into the area of the second pole plate 10. This essentially results in a coaxial arrangement of a first conductor, which is essentially provided by the fuel cell stack 4, with a number of second conductors which surround it. Since the current flows in the opposite direction in the first conductor and in the second conductors, the magnetic field which is produced by the currents in the external area of the fuel cell stack 4 is approximately compensated for, in particular because the current which is carried in the first conductor or fuel cell stack 4 and the return current which is carried overall in the second conductors or shielding cables 12 are of the same magnitude. The shielding of the stray magnetic field in the external area of the fuel cell stack 4 is in this case particularly comprehensive in the spatial area a long distance away; in the near area directly around the fuel cell stack 4, on the other hand, stray fields may still occur owing to geometry affects—in particular since the current is not returned in an envelope that completely surrounds the fuel cell stack 4.

The shielding cables 12 are routed on the external area of the fuel cell stack 4 as far as a contact area 14 for the second pole plate 10 of the fuel cell stack 4. The shielding cables 12 are joined together in the contact area 14 to form a first connecting contact 16, which is connected to a power cable 18. The power cable 18 is itself connected, in a manner which is not illustrated in any more detail, to a load which is to be fed from the fuel cell module 1.

Furthermore, the fuel cell module 1 is also designed to keep the stray magnetic field which may be produced by the shielding cables 12 in the contact area 14 as low as possible. For this purpose, a number, which corresponds to the number of shielding cables 12, of connecting cables 20 originate from the second pole plate 10 and are joined together in order to form a second connecting contact 22. The connecting cables are in this case physically routed such that one connecting cable 20 in each case comes to rest in the immediate vicinity of a respective shielding cable 12 in the contact area 14. This arrangement results in the stray magnetic field which is produced by the current flowing in each case one shielding cable 12 being approximately compensated for or cancelled out by the current flowing in the opposite direction in the connecting cable 20 which is in each case associated with this shielding cable 12. In other words, the overall stray magnetic field which is produced by a pair of cables which are in each case defined by a shielding cable 12 and an associated connecting cable 20 is kept particularly low, especially since the area which is surrounded by the cable pair, that is to say the respective shielding cable 12 and the respective connecting cable 20, is kept particularly small.

The second pole plate 10 is connected via the connecting cables 20 and via the second connecting contact 22 formed by them to a power cable system 24, which surrounds the power cable 18 in the manner of a coaxial arrangement. In the exemplary embodiment shown in the FIGURE, the power cable system 24 is in this case provided by a first conductor 26 and by a second conductor 28, which surround the power cable 18 at the sides. However, alternatively, a greater number of conductors or a sheath, for example a cylindrical sheath, which completely surrounds the power cable, may also be provided in order to form the power cable system 24.

The fuel cell stack 4 and, together with it, the fuel cells 2 which form it have an approximately square cross section in the exemplary embodiment. In order to achieve a particularly good shielding effect matched to this, the shielding cables 12 are arranged symmetrically around a central axis, which is extended in the stacking direction as indicated by the arrow 6, of the fuel cell stack 4. In this case, one shielding cable 12 is in each case arranged centrally, in particular on each outer face of the square cross section. This also results in the shielding cables 2 being spaced apart approximately uniformly on the circumference of the cross section, determined in the stacking direction, of the fuel cell stack 4. However if the fuel cell stack 4 has a cross-sectional shape other than the square shape, the shielding cables 12 may also be routed in some other way, matched to the respective cross-sectional shape. For example, if the fuel cell stack 4 were to have a rectangular cross section, it would be possible to distribute a number of shielding cables 12 on the circumference of the cross section such that the ratio of the number of shielding cables 12 routed on the longitudinal face of the rectangular cross section to the number of shielding cables 12 routed on the narrow face of the rectangular cross section is approximately equal to the ratio of the length of the longitudinal face to that of the narrow face.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

The invention claimed is:

1. A fuel cell module, comprising:
   a plurality of series-connected fuel cells combined to form a fuel cell stack; and
   a plurality of shielding cables electrically connected to a first pole plate of the fuel cell stack, wherein the cables are routed along a stacking direction of the plurality of series-connected fuel cells as far as a contact area for a second pole plate of the fuel cell stack to an external area of the fuel cell stack, the shielding cables being joined together in the contact area to form a first connecting contact,
   further wherein the first connecting contact is spaced apart from the first pole plate and the second pole plate.

2. The fuel cell module as claimed in claim 1, wherein the shielding cables are arranged symmetrically around a central axis of the fuel cell stack, the central axis extending in the stacking direction of the fuel cells.

3. The fuel cell module as claimed in claim 1, wherein the shielding cables are arranged at approximately uniform intervals on a circumference of a cross section of the fuel cell module, and the cross section of the fuel cell module is determined by the stacking direction of the fuel cells.

4. The fuel cell module as claimed in claim 1, further comprising a plurality of connecting cables originating from a second pole plate,
   wherein the connecting cables are joined together to form a second connecting contact, and each connecting cable corresponds to one of the shielding cables and is routed in the contact area in an immediate vicinity of the corresponding shielding cable.

5. The fuel cell module as claimed in claim 4, wherein the first pole plate is connected to a power cable and the second pole plate is connected to a power cable system which surrounds the power cable in the manner of a coaxial arrangement.

6. The fuel cell module as claimed in claim 4, wherein the first pole plate and the second pole plate are connected to at least two respective power cables, and the power cables of the first pole plate are arranged symmetrically with respect to the power cables of the second pole plate.

7. The fuel cell module as claimed in claim 1, wherein the first pole plate is connected to a power cable and the second pole plate is connected to a power cable system which surrounds the power cable in the manner of a coaxial arrangement.

8. The fuel cell module as claimed in claim 2, wherein the first pole plate is connected to a power cable and the second pole plate is connected to a power cable system which surrounds the power cable in the manner of a coaxial arrangement.

9. The fuel cell module as claimed in claim 3, wherein the first pole plate is connected to a power cable and the second pole plate is connected to a power cable system which surrounds the power cable in the manner of a coaxial arrangement.

10. The fuel cell module as claimed in claim 1, wherein the first pole plate and the second pole plate are connected to at least two respective power cables, and the power cables of the first pole plate are arranged symmetrically with respect to the power cables of the second pole plate.

11. The fuel cell module as claimed in claim 2, wherein the first pole plate and the second pole plate are connected to at least two respective power cables, and the power cables of the first pole plate are arranged symmetrically with respect to the power cables of the second pole plate.

12. The fuel cell module as claimed in claim 3, wherein the first pole plate and the second pole plate are connected to at least two respective power cables, and the power cables of the first pole plate are arranged symmetrically with respect to the power cables of the second pole plate.

13. A fuel cell module, comprising:
- a plurality of series-connected fuel cells combined to form a fuel cell stack; and
- a plurality of shielding cables electrically connected to a first pole plate of the fuel cell stack, wherein the shielding cables are routed along a stacking direction of the fuel cells as far as a contact area for a second pole plate of the fuel cell stack to an external area of the fuel cell stack, and each side of the fuel cell stack having one of the shielding cables that extends along the stacking direction of the fuel cell stack, further wherein the first connecting contact is spaced apart from the first pole plate and the second pole plate.

* * * * *